United States Patent
Rangachar

(10) Patent No.: US 6,301,252 B1
(45) Date of Patent: Oct. 9, 2001

(54) CONTROL AND MANAGEMENT OF ATM NETWORKS FROM SERVER COMPUTERS

(75) Inventor: Suresh Rangachar, Gaithersburg, MD (US)

(73) Assignee: Mantra Communications Incorporated, Germantown, MD (US)

( * ) Notice: Subject to any disclaimer, the term of this patent is extended or adjusted under 35 U.S.C. 154(b) by 0 days.

(21) Appl. No.: 09/061,104

(22) Filed: Apr. 16, 1998

(51) Int. Cl.[7] ............................................. H04L 12/56
(52) U.S. Cl. ................................. 370/395; 370/410
(58) Field of Search ..................................... 370/395, 398, 370/389, 397, 400, 428, 422

(56) References Cited

U.S. PATENT DOCUMENTS

| | | | |
|---|---|---|---|
| 5,774,662 | * | 6/1998 | Sakagawa .............................. 370/395 |
| 5,991,301 | * | 11/1999 | Christie ................................. 370/395 |
| 6,081,836 | * | 6/2000 | Karapetkov et al. ................. 709/218 |
| 6,097,723 | * | 8/2000 | Fielding et al. ....................... 370/395 |

* cited by examiner

Primary Examiner—Hassan Kizou
Assistant Examiner—Hanh Nguyen
(74) Attorney, Agent, or Firm—Lalos & Keegan

(57) ABSTRACT

A method, system, and system components to control and manage a cell-based network including cell-based switches connected by communications links for transporting cells of data between the switches. A management and control request directed to one of the switches in the network is diverted to a network manager. The network manager processes the request according to management and control procedures at the network manager to identify generic commands to transmit to one or more switches in the network. The generic commands are interpreted at each of the one or more switches to produce a respective instruction to direct operation of each of the one or more switches.

4 Claims, 5 Drawing Sheets

CONTROL AND MANAGEMENT OF ATM NETWORKS FROM SERVER COMPUTERS

TECHNICAL FIELD

The present invention relates generally to ATM (Asynchronous Transfer Mode) communication networks, and more specifically, to control and management of such networks.

BACKGROUND ART

ATM (Asynchronous Transfer Mode) high-speed packet switched networks have been proposed as a technology capable of integrating present digital services with new multimedia services, e.g., video on demand, live television from many sources, CD-quality music, LAN interconnection, and high-speed data transport for science and industry. To implement these different services, ATM networks are designed to handle a variety of traffic characteristics, e.g., constant rate, variable rate, and bursty, required for various real time, such as video conferencing, and non-real time, such as E-mail and web browsing, applications. The basic principles of ATM packet-switched networks are well known to those skilled in the art and are discussed in numerous published references (see, for example, Andrew S. Tanenbaum, Computer Networks, Prentice Hall, 1996, 3rd ed.).

FIG. 1 illustrates an ATM network 6 with a simple topology shown herein for purposes of explanation of the operations of an ATM network relevant to the present invention. Users, typically running applications on host computers, are connected to the network, in this figure two users are labeled as A and B. The host computers generally execute applications for the users whereas the ATM switches 1–5 of the ATM network 6 are solely concerned with the communication of data among the hosts along paths in the network. A network manager 22 may monitor network status and perform other network tasks.

By way of example, in FIG. 1, one possible path of data flow would be from User A across the UNI (user-to-network interface) to switch 1, and from switch 1 to switch 2 to switch 4 across the NNI (network-to-network interface) interfaces and from switch 4 to User B across the UNI interface. In this example, User A is assumed to be sending data to User B. Hence, User A is considered the source and User B the destination. The roles would reverse in the case where User B sends data to User A. Thus, User A is sending data which flows through the network and reaches User B. A path between User A and User B in the network is referred to herein alternately as a connection, circuit, or virtual path.

In an ATM network, data is transmitted between the switches of the network in small, fixed size 53 byte long ATM cells having 5 bytes for a header and 48 bytes for the data payload. The header of each cell contains a virtual address used for routing the cells over the network. Each ATM cell contains a two-part address in the cell header: a Virtual Path Identifier (VPI) and a Virtual Circuit Identifier (VCI). This two-part address uniquely identifies an ATM virtual connection on a physical interface (a bundle of circuits being contained within a path).

Once a connection is established, data can be exchanged between User A and User B. Typically, the flow of data proceeds as follows. User A opens an application on the computer of User A which sends data to User B. Network software at User A's side will receive the data from the application of user A, and arrange the data into packets. Each packet is arranged as one or more 53 byte ATM cells carrying the data payload preceded by a packet header cell containing information related to the application. The packets are sent over the ATM network cell by cell from User A to User B. The cells are then reassembled into packets by software at User B's end and presented to User B as an application packet.

In an ATM network, before data is exchanged between users, a connection must be established. That is, a call is required by user A to user B, similar to a telephone call, to set up a connection between the two users. Once the connection path is established, all data cells are transferred over the same connection path. This guarantees that cells will be delivered in order. Although ATM establishes a circuit between hosts, it establishes this circuit internally using packet switching technology. When a virtual circuit is established between hosts, what really happens is that table entries storing routing information are made in each switch along the path between the hosts.

Referring to FIG. 1, the following is an example of what happens when a user A connects to user B. First, user A sends a call request to user B. The call request arrives at switch 1. Call processing software located at switch 1 uses signaling procedures combined with routing services to locate user B and establish a virtual connection over which user A and user B exchange data. During the call setup process, messages are being exchanged between the switches of the network and control functions run on the switches until a connection is established allowing transfer of data between user A and user B.

Establishing a connection is a control function of the network. The functions of the control plane of the network are typically concerned with the actual task of creating and maintaining the network path topology. This includes functions for establishing, rerouting, and terminating connections. The functions of the management plane administrates network resources. Examples of management plane function include the collection of traffic statistics, monitoring, and detecting switch failures. The management plane and control plane are distinct from the data plane, which is concerned solely with the routing and switching of data cells within the network.

In conventional network systems, many of the control and management tasks are commonly performed on the switches themselves. FIG. 2 illustrates one possible configuration of a conventional switch 1–5. The switching fabric 38 accepts ATM cells with data arriving at input lines 33 from the network and puts the cells onto the appropriate output lines 35 to the network. As is well-known to one of ordinary skill in the art, a switching control unit 34 of an ATM switch will route a cell on an incoming line to an outgoing line based on the line number and an address header appearing in the incoming cell. The switching control unit 34 will then replace the header of the cell with a new header stored in the same index location before sending the cell to another switch. Thus, the main function of the switching components 34 and 38 which constitute the switching unit 14 is to carry out the data plane function of mapping ATM cells from input lines to output lines. The CPU 30 communicates instructions to the switching unit 34 on path 12a. The switching unit 34 may communicate state information to the CPU 30 on data path 12b.

As shown in FIG. 2, switch 1–5 includes a CPU 30 and memory 32 containing control and management software which implements the functionality of the management and control plane, including network routing, network signaling, for example to establish a connection, connection admission control, for example to determine whether to accept a call at the requested quality of service, and other procedures and programs for control and management of the switch. A network manager 22 may be able to transmit information 13a and receive information 13b from switch 1–5 to handle various management functions, such as monitoring. An example of an important control function, would be signaling, i.e. the establishment of a connection between two host machines. In the signaling process, a switch 1–5 would receive a request to establish a connection with network 6. The request may have been generated from a user or another switch. To process this request, CPU 30 will run the signaling routines stored in memory 32. If a connection is established, the CPU 30 will provide instructions 12a to the switching control unit 34 to establish the connection in switching fabric 38. Since each of the switches may be from different vendors, instructions 12a may be different from vendor to vendor. This requires a switch have a CPU and embedded control and management software to perform control and management tasks. This creates several significant problems for present day network systems.

First, because every switch in the network requires complex network and management software, a switch must have a CPU, memory, and software which drives up the complexity and cost of each switch.

A further problem is that switches in an ATM network may be designed by different vendors. Thus, upgrading a network system may potentially require an engineer on site to upgrade software from different vendors onto the various switches. This places a significant burden on the system administrator and creates significant additional cost for any proposed system enhancement or upgrade.

A further problem is the lack of interoperability of switches within the network system. Since different switches may have different management and control software, a switch upgraded to include a new feature may not operate properly with other switches in the network produced by other vendors. Thus, having different management and control software on each switch actually contributes to a decline in quality and reliability of the entire system.

Another implication of having management and control software on a switch, is that the sophistication of the software is limited to the resource limitations of a switch. The speed, complexity, and memory size of a switch must be kept low for economic reasons. Thus, for example, a sophisticated congestion algorithm which would improve network performance may not be implemented because it would require significant memory or CPU cycles.

OBJECTIVES OF THE INVENTION

Accordingly, it is an object of the present invention to reduce the complexity of network switches.

It is a further object of the present invention to enhance network reliability, and reduce the cost of a switch.

It is a further object of the present invention to enhance interoperability of switches from different vendors.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In order to achieve the above objectives, the present invention provides centralized management and remote control of a network of cell-based switches. A network system according to the present invention includes a network manager (sometimes referred to as a network server or a network management station) communicating with a plurality of cell-based switches connected by communications links.

The network manager may be implemented on one or more computer servers. The control software may be implemented on a separate computer server from the computer server implementing the management software. Preferably, the management and control software are on the same computer server.

The network manager receives commands directed to the switches and processes these commands with control and management software located at the network manager to determine generic commands to send to one or more of the switches. Each switch of the network contains a vender-specific command interface which interprets the generic commands, translating them into switch specific instructions, to regulate the switch. By this technique, the network manager can carry out an operation on the network through remote control of the switches.

In accordance with one aspect of the present invention, a management and control request directed to one of the switches in the network is diverted to the network manager. The term "control and management request" as used herein refers to any and all control and management requests and may include only control requests or only management requests. A typical control and management request is a request to establish a connection between two users of the network. To make such a request, one of the users of the network will initiate a call request by sending a call request message to one of the switches of the network which will then divert the request to the network manager.

The network manager processes the request according to control and management procedures at the network manager to identify generic commands to transmit to one or more switches in the network. The generic commands are interpreted at each of the one or more switches to produce a respective instruction to direct operation of each of the one or more switches.

According to another aspect of the present invention, a request to direct an operation on the network is received at the network manager, and processed at the network manager according to defined procedures to select one or more switches to determine commands to send to the selected one or more switches. The commands so determined are then sent to each of the selected one or more switches, and interpreted at each of the one or more switches. Each switch is operated to carry out the requested operation in accordance with the interpreted commands.

The network manager of the present invention remotely controls and manages a plurality of cell-based switches in a cell-based network, typically, an ATM network. The network manager receives control and management requests from a source, which is typically a switch, but could also be another computer such as a computer hosting one or more users of the network. A request from a switch could be generated within the switch and sent to the network manager or directed to the switch from another computer and immediately relayed to the network manager.

A control and management section within the network manager processes the request according to control and management procedures and determines necessary command information to control one or more of the switches. In a typical control operation, for example, establishing a connection between user nodes, the network manager may have to send messages to one or more switches. If so, the control and management section will determine these switches and the control information to send to each switch. Alternately, an operation by the network manager may only require sending a message to a single switch. An example would be the issuance of a management command to a single switch.

A generic command module within the network manager converts the determined information into generic commands and sends the general commands to one or more switches. The generic commands are the same command language to communicate with every switch, even though switches may have been manufactured by different vendors.

In order to provide intelligence on the network, the control and management section may include a state model representing state information on the network, including the state of each of the plurality of switches. The network manager may then determine necessary control information needed to carry out a network operation by creating a plurality of processes, one process for each of the switches, and exchanging information among the processes partially based on the state model.

A cell-based switch of the present invention, typically an ATM switch, includes input lines configured to receive cells, output lines configured to transmit cells, and a switching unit configured to route cells from the input lines to the output lines. A switch could be of any vendor type. A control unit coupled to the switching unit is configured to interpret generic commands received from a remote source, typically the network manager, into switch specific instructions for directing operation of the switching unit.

The cell-based switch may further include operational components for control and management of the switch configured to interpret the generic commands. The operational components would generally include control and management functions not directly associated with the switching unit and the functions for switching data. For example, the operational components may have the ability to detect an abnormal state and report that state of the switch to the network manager.

By eliminating the need for complicated control and management software in every switch, the present invention achieves its objectives. The cost of a switch is significantly decreased. Since control and management originates from a centralized location, sophisticated software can be implemented solely at that centralized location taking advantage of increased memory and computing power to improve the quality of control and management operations, thus increasing network reliability. Because every switch receives the same generic commands, network interoperability is enhanced.

BEST MODE FOR CARRYING OUT THE INVENTION

Figure 1:
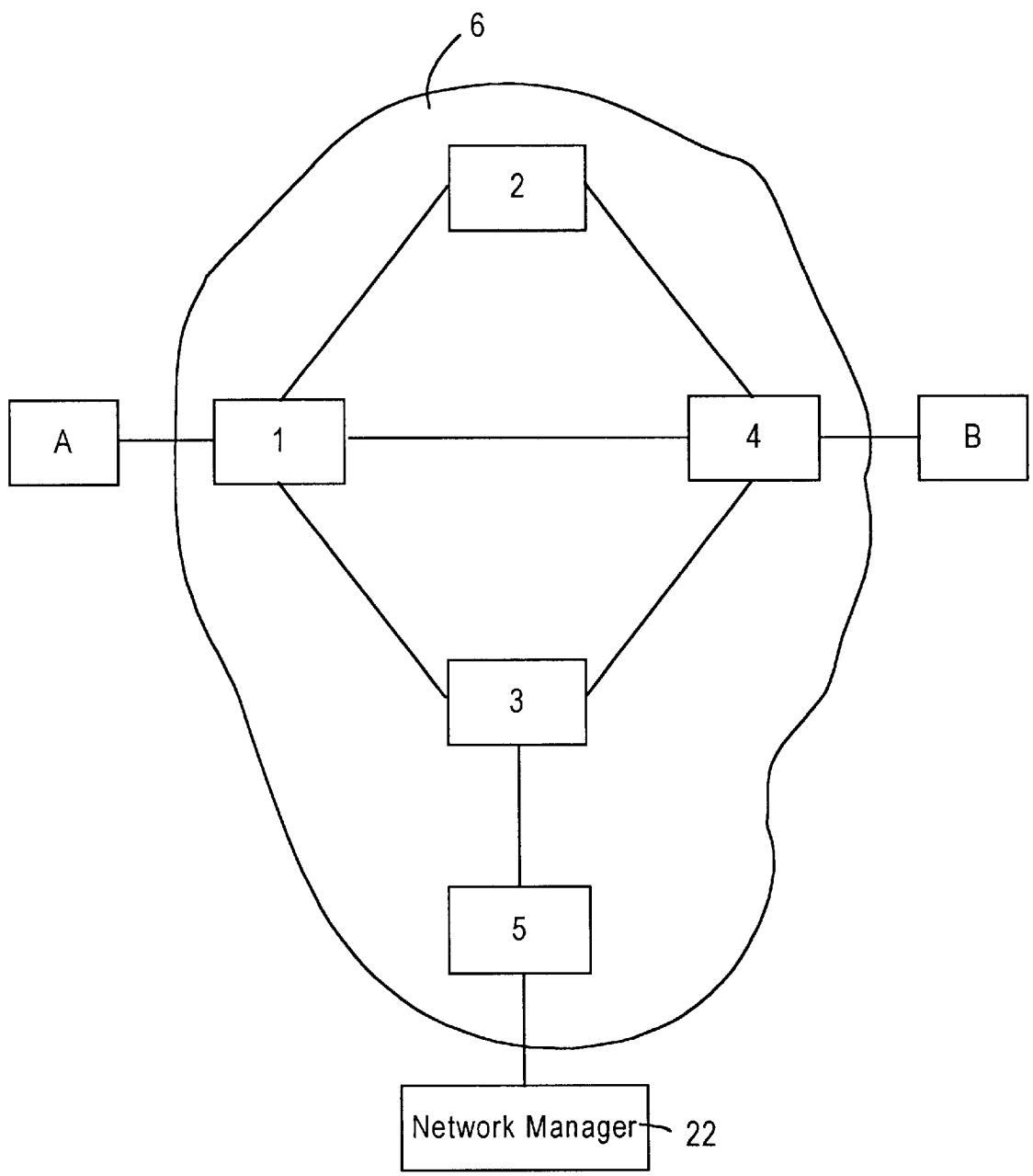
FIG. 1 is a system diagram showing host computers connected to a conventional ATM network.
Figure 1A:
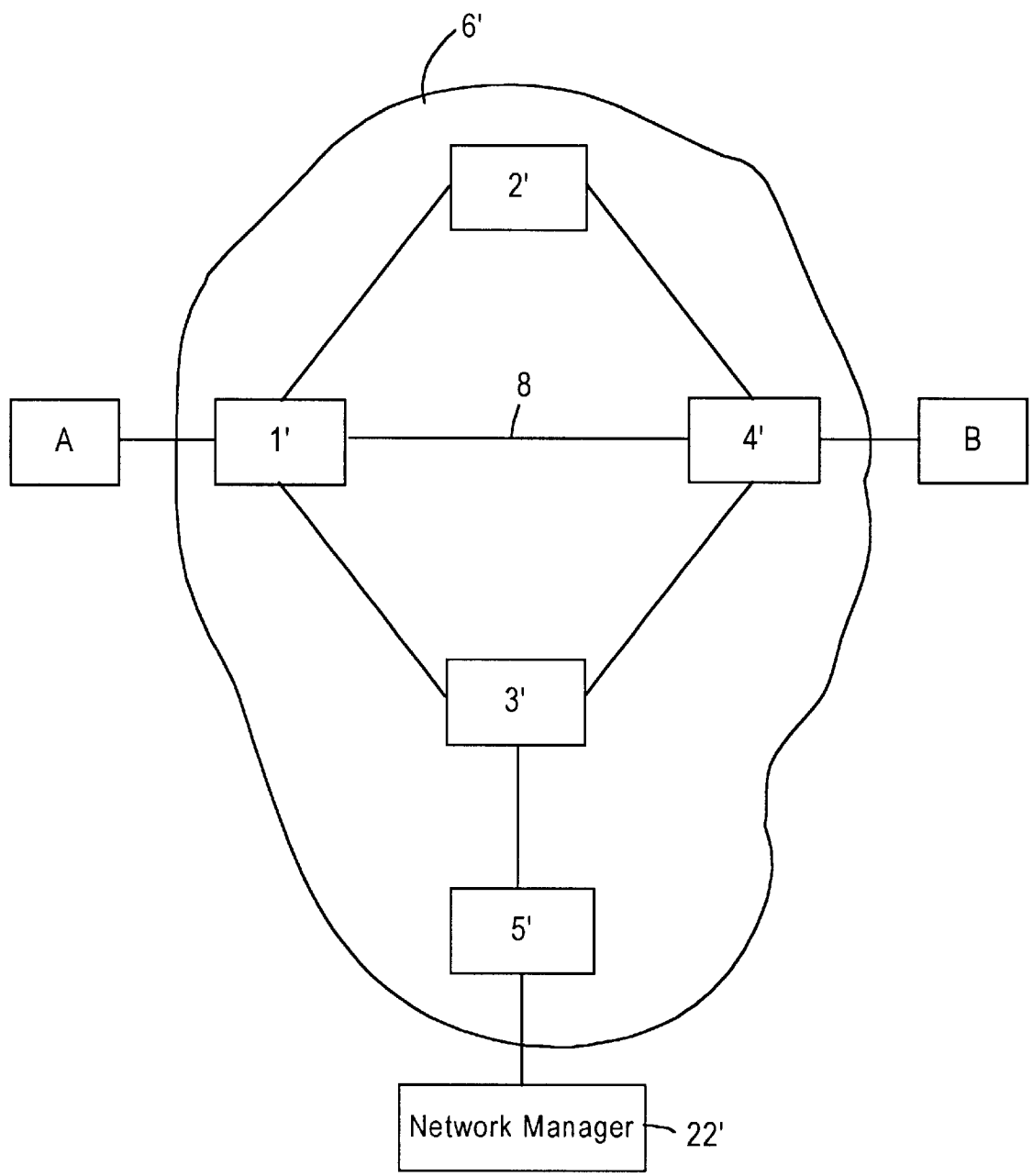
FIG. 1A is a system diagram showing host computers connected to an ATM network in accordance with the present invention.

FIG. 1A illustrates an ATM network system 6' of the present invention including switches 1'–5' forming connection paths over which data may be exchanged in 53 byte ATM cells. Two users are shown connected to the network. User A connects to the network at switch 1'. User B connects to the network at switch 4'. A network manager 22' is shown connected to a switch 5'. The difference between the prior art network 6 and the network of the present invention 6' resides in the network switches 1'–5' and the network manager 22'.

Figure 3:
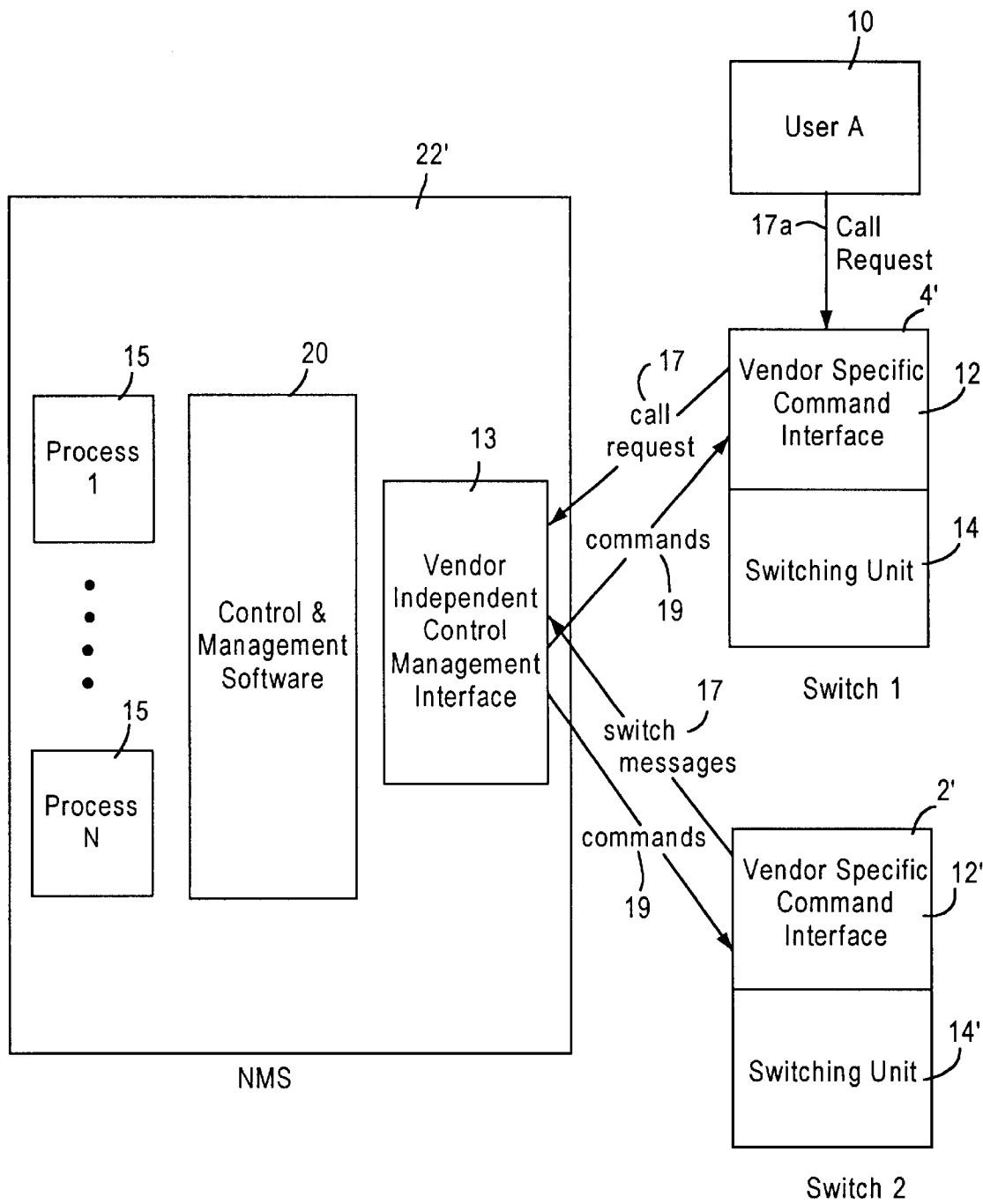
FIG. 3 is a block diagram illustrating centralized control and management of the network in accordance with the present invention.

FIG. 3 further illustrates the Network Management Station(NMS) 22' in communications with a plurality of interconnected ATM switches 1' through 5', although only 2' and 4' are depicted in FIG. 3 for simplicity within the network 6', which for clarity is not shown in FIG. 3. Although, FIG. 3 shows a single NMS 22', a complex network, could have more than one NMS, with each NMS managing a group of switches of the network. The NMS includes control and management software 20 and a vendor independent control management interface 13. The control and management software may be distributed on one or more computers, and the control software may be on a separate computer from the management software. Each switch 1'–5' includes a respective vendor-specific command interface. As shown in FIG. 3, the switch 4' has vendor-specific command interface 12 and a switching unit 14 and switch 2' has a vendor-specific command interface 12' and a switching unit 14'.

The NMS 22' receives a request for a control request 17 from the switch 2', processes the request with control & management software 20, and, in order to carry out the appropriate control function formulates a command using the vendor-specific command interface 13 which then sends a generic command message 19 in response to request 17 to the switch 2'. The command message 19 can be understood by any of the switches 1'–5', as will be described further below. In a control operation requiring coordination of many switches, a generic command message 19 may be sent to more than one switch, e.g. switches 2', and 4', as shown, to execute the required operation. In switch 2', the vendor-specific command interface 12' translates the command 19 into instructions for controlling switching unit 14' or for initiating other operations within switch 2.

Each switch 1'–5' is capable of sending a message 17 to the NMS 22' to request a control message 19 related to control and management tasks. Typical examples, of switch messages 17 would be control actions, such as a call request, or a management action, such as a report to the NMS of an event such as a switch abnormality. FIG. 3 depicts a situation where a User A sends a call request 17 to Switch 4' which then diverts the call request, i.e. resends it without processing, by sending the call request 17 to the NMS 22'.

The NMS 22' is a general-purpose computer running management and control software 20 for the network system. The NMS 22' of the present invention contains software which communicates with the switches 1'–5' of the network 6' by issuing commands to the switches and receiving requests or responses from the switches. The NMS 22' preferably connects to the switches 1'–5' of the network 6' through a dedicated control channel. This may be, for example, a permanent virtual circuit (PVC) or a switched virtual circuit (SVC) dedicated to control and management.

The NMS 22' performs centralized control and management of the network 6'. To provide the intelligence to make centralized management possible, the NMS 22' maintains the current state of the network in a plurality of processes 15. The NMS 22' maintains a process corresponding to each switch 1'–5' in the network 6'. A process contains the present state of a switch, which would include, for example, the present state of switching devices within the switch. A process may be implemented in any of a number of ways which will be understood by those skilled in the art. For example, a process could be a state machine or other program which models the states and state transitions of a switch based upon the desired control and management functions. Hence, when management & control of the NMS 22' requires knowledge of the states of the network switches 1'–5', for example, in a call setup, to perform its computations, the entire state of the network resides in the NMS 22' making such a computation possible. This will be further illustrated below for the call setup operation.

Figure 2:
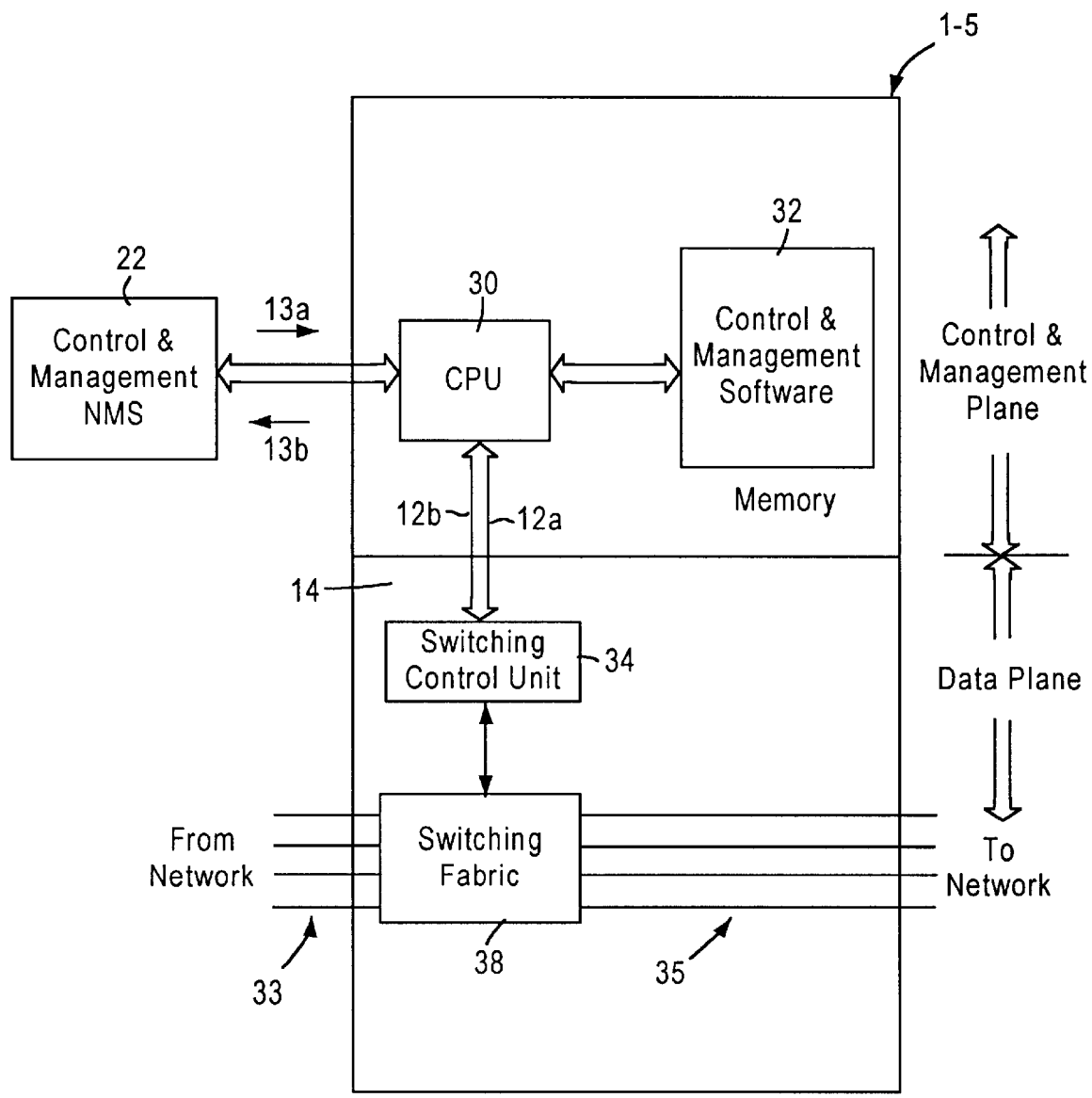
FIG. 2 is a block diagram illustrating control and management of a switch in the conventional art.
Figure 2A:
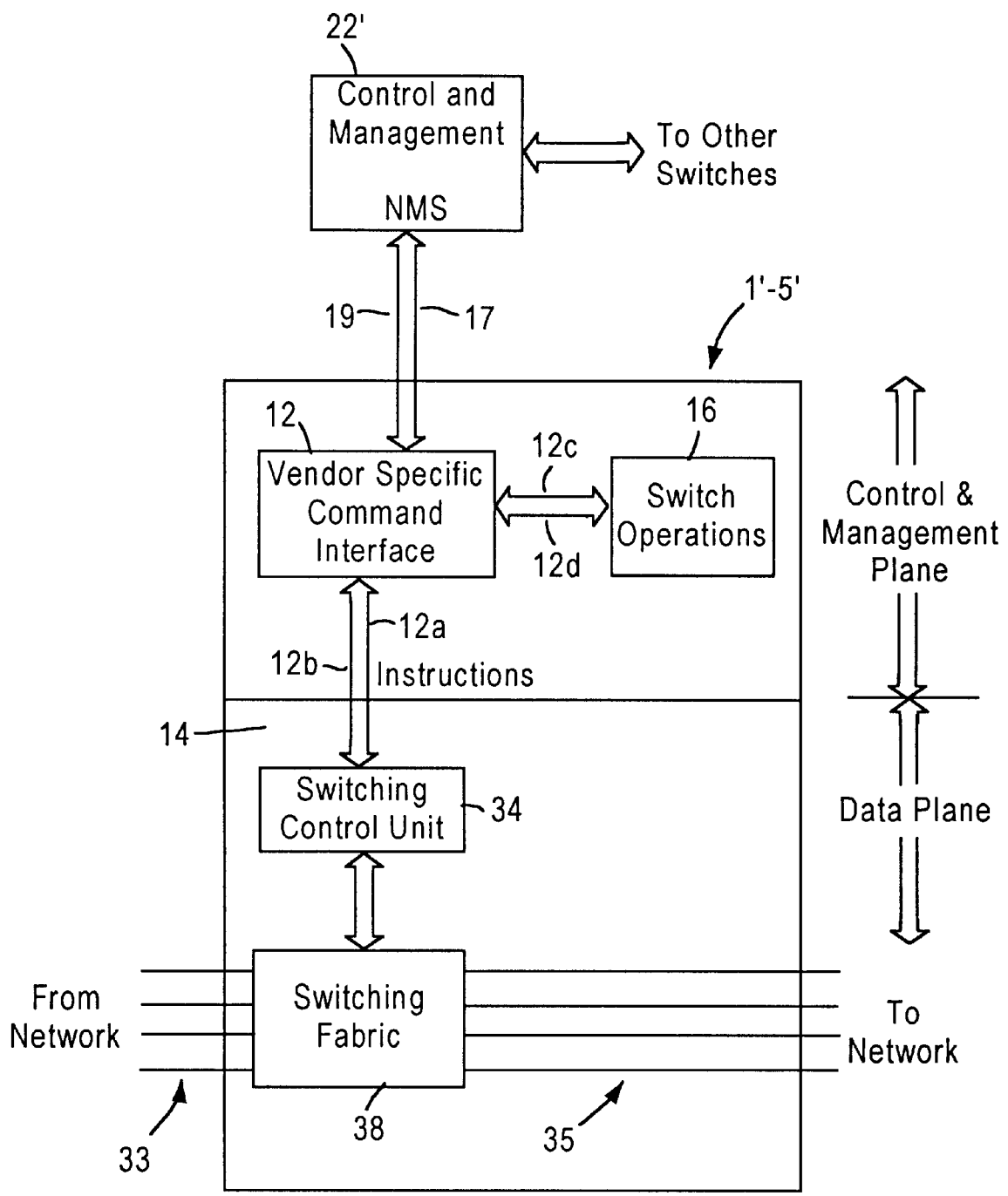
FIG. 2A is a block diagram illustrating control and management of a switch in accordance with the present invention.

FIG. 2A illustrates a preferred embodiment of a switch 1'–5' in accordance with the present invention. As shown, the switching unit 14 includes a conventional switching control unit 34 and switching fabric 38. The switching unit 14 primarily performs the function of the data plane as described above with reference to the conventional switches 1–5 shown in FIG. 2. However, in switches 1'–5', the CPU 30 and memory 32 storing control and management software have been replaced by the vendor specific command interface 12.

The vendor specific command interface 12 accepts generic command messages 19 from the NMS 22' and translates these generic command messages 19 into vendor-specific instructions 12a which are then sent to the switching control unit 34. Vendor-specific instructions 12c can also be sent to switch operations 16. Switch operations 16 include any modules associated with control and management of the switch 1' –5'. Data paths 12b and 12c from the switching control unit 34 and switching operations 16, respectively, to the vender specific command interface 12 denote possible transfer of data and state information.

A vendor-specific command interface 12 resides on every switch. The command interface maps generic commands 19 issued by the NMS 22' into instructions 12a to control the hardware of the switch control unit 14. Thus switches 1'–5' constructed by different vendors would have different command interfaces 12. The NMS 22' contains a vendor independent control management interface 13 which sends command messages 19 of the same generic command language to the switches 1'–5'. The vendor-specific command interface 12 then translates the generic command message 19 into the specific instructions 12a for a particular switch 1'–5'.

To illustrate operations of the NMS 22', an example of the processing of a call request according to the present invention is now described. The process begins when a source user desires to establish a connection with a destination user connected to the network 6'. In this example, referring to FIG. 1A, User A wishes to establish a connection with User B. User A initiates the signaling process by sending a call request to switch 1'. Switch 1' then relays received the call request to the NMS 22'. The signaling procedure, which would be realized by communications of information from switch to switch in a conventional network, is accomplished in the NMS 22' in accordance with the present invention.

Referring to FIG. 3, signaling is simulated by passing data between switch processes 15. Since each process contains the current state of a switch 1'–5', the routing procedure, which conventionally would require passing messages between switches 1–5 in the network 6, is now performed entirely in the NMS 22', by executiong this activity using processes 15. Based on this model, the NMS 22' is able to formulate commands to send to the switches within the determined route between User A and User B.

In this example, we assume that the NMS 22' chooses a route 8 through switches 1' and 4'. The network manager 22' programs switches 1' and 4' by sending them commands 19 which are interpreted by the generic command interface 12 of each switch 1', 4'. The generic command interface 12 outputs the translated command and instructions 12a to program switching unit 14 to remember the desired path. The NMS 22' then sends a call to User B through a control connection. User B sends a call accept to the NMS 22'. The NMS 22' updates the state machines in the processes 15 running switches 1' and 4' and sends the call accept to User A. Communications of data then flows between User A and User B through switches 1' and 4' without further interaction with the NMS 22'. When a clear request is sent by User A to Switch 1', a similar procedure is performed and the NMS 22' releases the resources reserved for the call. The NMS 22' sends a message to switches 1' and 4' to clear the connection entries.

Other control functions that may be centrally managed by the NMS 22' are link management activities, such as changing virtual paths in response to congestion. The NMS 22' is also capable of performing centralized management. For example, whenever an abnormal condition occurs that causes an event on a switch 1'–5', the switch reports the event to the NMS 22'. The NMS 22' uses the event to update its local process describing the state of the switch. Additionally, the NMS 22' may periodically collect statistics from the switches 1'–5' providing input to NMS 22' management programs.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. ATM network control and management, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A method for controlling a network including multiple switches, comprising:

storing a plurality of processes, each of the plurality of processes being associated with a respective one of the multiple switches;

simulating communications over the multiple switches by executing the plurality of processes such that data is transferred between the plurality of processes;

generating generic control signals for controlling the multiple switches based on the simulated communications;

transforming the generic control signals into control signals corresponding to each of the multiple switches; and configuring each of the multiple switches in accordance with the control signals corresponding to that switch.

2. A method according to claim 1, wherein the plurality of processes include information representing a current state of each of the multiple switches.

3. A method according to claim 1, further comprising:

receiving an indication of congestion at one of the multiple switches;

wherein the communications are simulated based on the received indication of congestion.

4. A method according to claim 1, further comprising:

receiving a request for a communication service, at one of the multiple switches;

diverting, without processing, the received request from the one switch;

wherein the communications are simulated based on the diverted request.

* * * * *